United States Patent
Charmes et al.

(10) Patent No.: US 6,494,712 B1
(45) Date of Patent: Dec. 17, 2002

(54) TUNNEL TYPE HEATING EQUIPMENT FOR SURFACE TRANSMISSION OF INFRARED RADIATION

(75) Inventors: Michel Charmes, St Didier au Mont d'or (FR); Eric Rogemond, Satolas et Bonce (FR)

(73) Assignee: Sunkiss, Sathonay Camp (FR)

( * ) Notice: Subject to any disclaimer, the term of this patent is extended or adjusted under 35 U.S.C. 154(b) by 0 days.

(21) Appl. No.: 09/869,861

(22) PCT Filed: Feb. 23, 2000

(86) PCT No.: PCT/FR00/00453

§ 371 (c)(1),
(2), (4) Date: Jul. 6, 2001

(87) PCT Pub. No.: WO00/58678

PCT Pub. Date: Oct. 5, 2000

(30) Foreign Application Priority Data

Mar. 25, 1999 (FR) .............................................. 99 03904

(51) Int. Cl.[7] .................................................. F27B 3/20
(52) U.S. Cl. ........................ 432/175; 432/147; 392/432
(58) Field of Search ................................. 432/147, 175; 392/343, 375, 397, 408, 414, 424, 432, 433, 436, 437; 219/389, 390, 391

(56) References Cited

U.S. PATENT DOCUMENTS

| 2,472,293 A | * | 6/1949 | Groven ........................ 392/414 |
| 2,474,301 A | | 6/1949 | Blaha |
| 3,045,100 A | * | 7/1962 | Mills ............................ 392/408 |
| 3,582,614 A | * | 6/1971 | Zellers ......................... 392/436 |
| 5,586,877 A | | 12/1996 | Charmes |
| 6,270,336 B1 | * | 8/2001 | Terashima et al. .............. 431/6 |

FOREIGN PATENT DOCUMENTS

| EP | 0 261 462 A2 | 3/1988 |
| EP | 0 390 231 A2 | 10/1990 |
| WO | WO 98/12476 | 3/1998 |

* cited by examiner

*Primary Examiner*—Gregory Wilson
(74) *Attorney, Agent, or Firm*—Oliff & Berridge, PLC

(57) ABSTRACT

Equipment (60) for the surface emission of infrared radiation, comprising a thermally insulated wall (62) forming a tunnel (63), and a number of unitary surface emission devices (1) each arranged with respect to and in the thermally insulated wall (62), characterized in that, in combination:

each unitary surface emission device (1) comprises a box (21) arranged in the thermally insulated wall (62) and in which there is formed an opening (22) facing the downstream face (30) of the catalytic combustion wall (3);

a number of transparent ceramic window panes (23) are mounted in such a way as to form, with the various seats of catalytic combustion (2), a respective number of circuits (24) for discharging the flue gases (25);

the thermally insulated wall (62) comprises a secondary surface emission metal sheet (64) in a direct heat-exchange relationship with the tunnel (63) and forming with the remainder of the wall (62) a channel (65) for the flat circulation of burnt gases (25).

14 Claims, 5 Drawing Sheets

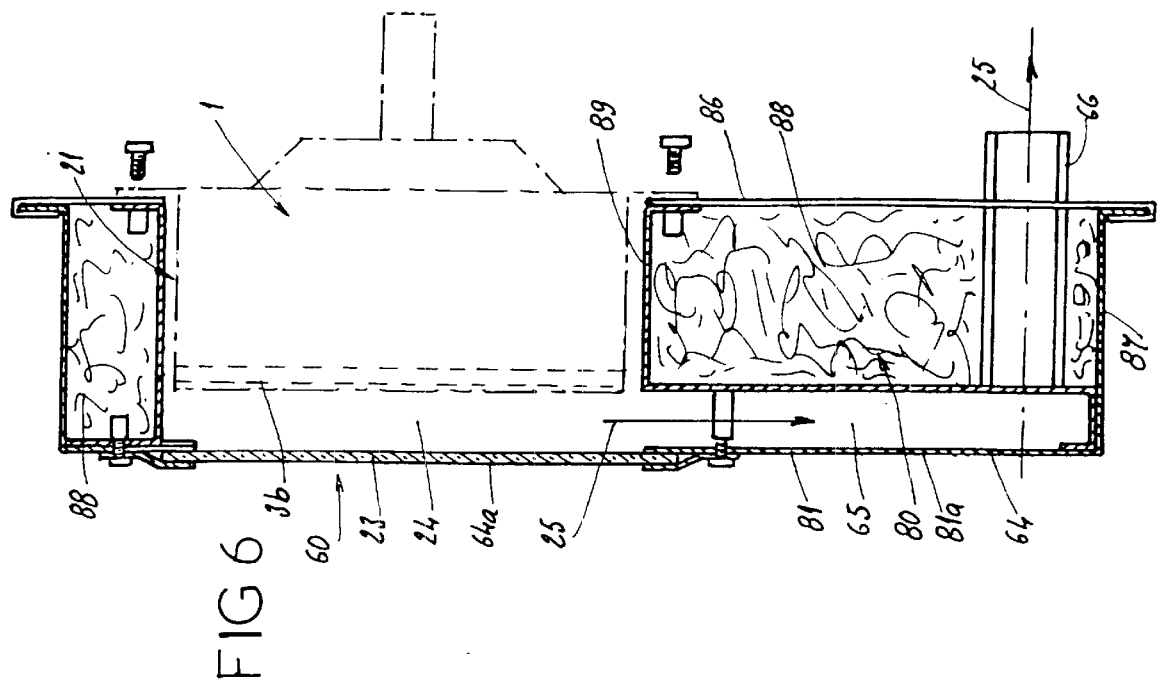
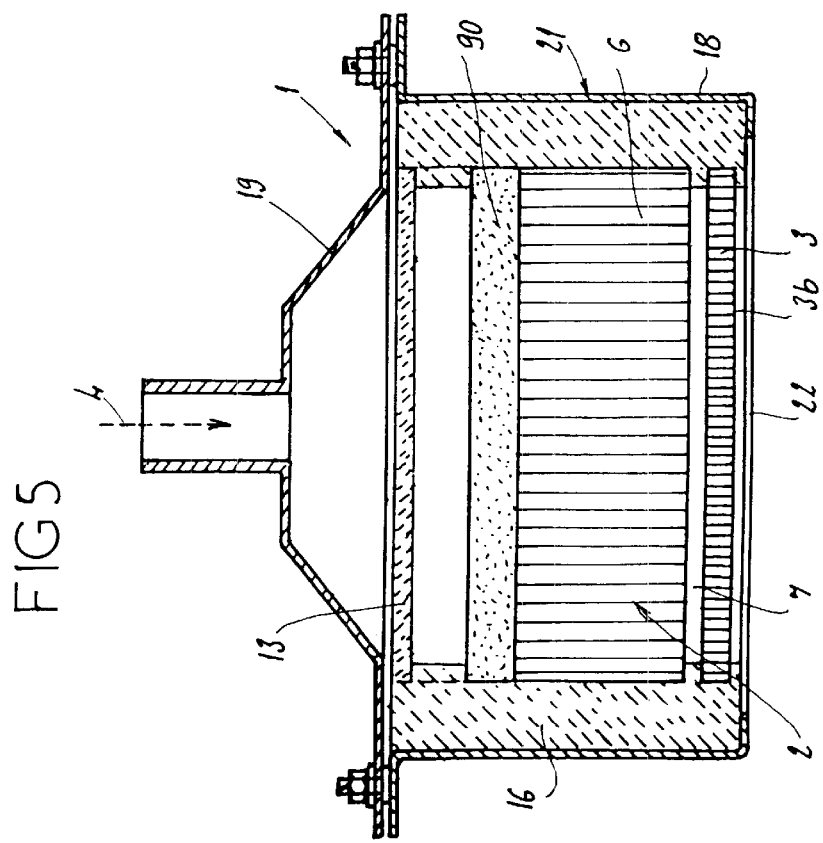

TUNNEL TYPE HEATING EQUIPMENT FOR SURFACE TRANSMISSION OF INFRARED RADIATION

BACKGROUND OF THE INVENTION

The present invention relates to an equipment for the surface emission of infrared radiation, such as used, for example, for drying and/or curing paints, mastics, lacquers, glues, etc., or for preheating a plastic prior to thermoforming.

SUMMARY OF THE INVENTION

By way of example, although not exclusively, the invention relates to installations of the tunnel type comprising a thermally insulated wall forming a tunnel which is elongate in a direction of residence or travel of at least one object to be treated with said infrared radiation. These installations generally comprise a number of unitary surface emission equipments or modules, each arranged with respect to and in the thermally insulated wall, in such a way that their respective faces emitting the infrared radiation face toward the inside of the tunnel. Each surface emission equipment item or module comprises one or more surface emission devices. Each said device comprises a seat of catalytic combustion comprising a catalytic combustion wall made of refractory material, permeable in its thickness and suited to the passage of a mixture for burning (fuel gas, for example natural gas, plus oxidizing gas, for example air) from its upstream face to its downstream face emitting said infrared radiation and discharging the flue gases. The developed interior surface of the catalytic combustion wall is coated with a combustion catalyzing material, for example platinum and/or palladium. The seat of combustion comprises an upstream chamber supplied, on one side, with mixture for burning and closed, on the other side, by the catalytic combustion wall.

For an installation such as the one defined above, the object of the present invention is various arrangements collaborating with one another with a view tO recuperating and consuming at least a substantial proportion of the residual heat present in the flue gases of each, or of the various, unitary, surface emission equipment item(s).

According to the present invention, the surface emission equipment comprises, in combination, the following characteristics:

the surface emission device comprises a box in which the seat of catalytic combustion is arranged at least in part, and in which there is formed an opening facing the downstream face of the catalytic combustion wall;

at least one window pane made of transparent ceramic material is mounted, for example in the box of the surface emission device, so as to form, with the seat of catalytic combustion, a circuit for discharging the flue gases leaving via the downstream face of said surface emission device;

and the equipment comprises a secondary surface emission metal sheet forming a flat circulation channel for the flue gases and communicating on the one side with the circuit for discharging the flue gases of the surface emission device and, on the other side with at least one outlet pipe for transferring the flue gases out of the equipment.

By virtue of these arrangements, the object or objects to be treated receive secondary thermal radiation which adds to the main infrared radiation, emitted by an equipment item according to the invention.

BRIEF DESCRIPTION OF THE DRAWINGS

The present invention is now described with reference to the attached drawing, in which:

FIG. 5 depicts, viewed in section and diagrammatically, a surface emission device according to a second embodiment of the present invention;

FIG. 6 depicts, viewed in section and diagrammatically, a unitary surface emission equipment item incorporating a device according to FIG. 5.

DETAILED DESCRIPTION OF THE PREFERRED EMBODIMENTS

Figure 1:
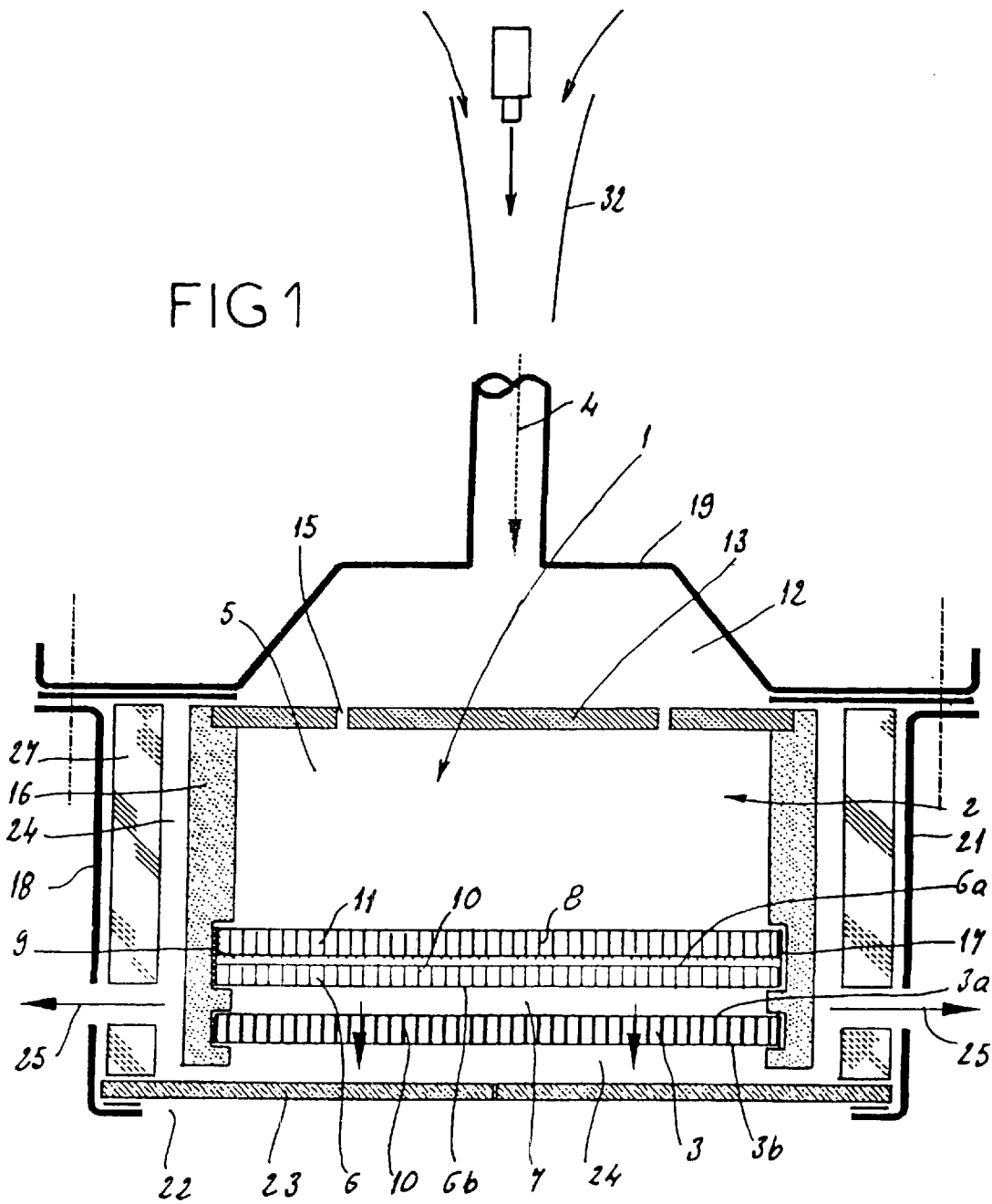
FIG. 1 depicts, in section and diagrammatically, a unitary surface emission device comprising a surface emission device with a seat of catalytic combustion, according to a first embodiment of the present invention.

According to a first possibility, use is made of a number or multitude of unitary surface emission equipments 60, the surface emission device 1 of which is in accordance with a first embodiment depicted in FIG. 1.

In accordance with FIG. 1, a unitary equipment item 60 comprises a device 1 for the surface emission of infrared radiation, which essentially consists of a seat 2 of catalytic combustion, a means 32 for forming or obtaining the mixture for burning, and a box 21 in which the seat of combustion 2 is arranged at least in part.

The seat of combustion 2 is organized and constructed around three walls, 3, 6 and 8, which may or may not be identical, and which, for example have a rectangular shape, made of refractory material, permeable through their thickness, and each designed for the passage of the mixture 4 for burning from their upstream face to their downstream face in the direction of flow of the said mixture for burning. These three walls, 3, 6 and 8, each consist of a cake of refractory ceramic, for example cordierite, through which a multitude of parallel channels 10 pass, from the upstream face to the downstream face, still in the direction of passage of the mixture 4 for burning. By way of example, this may be a cake of a material of the honeycomb type, as sold by various manufacturers such as Corning under the trade name CELCOR®, and used for example in combustion engine exhaust gas catalytic converters.

From upstream to downstream, with respect to the direction of flow of the mixture 4 for burning, these walls are, in succession:

a wall 3 for the catalytic combustion of the mixture 4 for burning, the internal developed surface of which is coated with a combustion catalyzing substance, for example, a deposit of a mixture of platinum and palladium, on the refractory material of said catalytic combustion wall 3, possibly via a layer or coating of another inorganic material with a large developed surface area, for example alumina;

a heat exchanger, or heat exchange wall 6, arranged upstream of and facing the catalytic combustion wall 3;

and a thermal insulation wall 8 arranged some distance away, upstream of and facing the heat exchange wall 6.

These three walls, 3, 6 and 8, which are superposed and aligned along the axis 4 of the device, are mounted transversely 2 with respect to said seat and precisely with respect to its refractory and insulating inner sleeve 16, via a seal 17 between the peripheral edge face of each wall or cake 3, 6 or 8, and said sleeve 16.

The seat of combustion 2 is arranged, at least in part if not in its entirety, in a box 21, forming at least one opening 22 facing the downstream face 3b of the catalytic combustion wall 3, and through which the infrared radiation is emitted from the downstream face 3b of the wall 3.

The box 21 comprises a body 18 closed by a lid 19, mounted facing a partition 13 parallel to the walls, 6 , 8, and 10, which are themselves mutually parallel. A multitude of passages 15 for expanding the mixture 4 for burning are arranged in this partition 13, which separates, on one side, that is to say on the upstream side, a chamber 12 for the distribution of the mixture 4 for burning from, on the other side, that is to say the downstream side, a chamber 5 known as the upstream chamber, with respect to the catalytic combustion wall 3, still in the direction of flow of the mixture 4 for burning.

The upstream chamber 5 is supplied, on one side, from the expansion partition 13, with mixture for burning, and is closed on the other side by the catalytic combustion wall 3. The heat exchange wall 6 arranged upstream of and facing the catalytic combustion wall 3, receives, during operation via its downstream face 6b, at least most of the heat radiated by the upstream face 3a of the catalytic combustion wall 3 through which the mixture for burning flows and within which catalytic combustion of said mixture takes place. This heat exchange wall 6 is arranged only in the upstream chamber 5 and with the catalytic combustion wall 3 determines an intermediate gap 7, separated from the rest of the upstream chamber 5 by this heat exchange wall 6.

The thermal insulation wall 8 is arranged upstream of and facing the heat exchange wall 6, still transversely in the upstream chamber 5, to determine with the wall 6 an intermediate gap 9 separated from the rest of the upstream chamber 5 by this thermal insulation wall 8. A diffuser 11 of the mixture 4 for burning is arranged transversely in the intermediate gap 9. This diffuser comprises a sheet which is permeable to the mixture for burning, made of refractory material, for example paper or ceramic foam.

The thermal insulation wall 8 and the diffuser 11 may be one and the same component, for example a wall made of ceramic foam which may or may not be up against the heat exchange wall 6.

As shown clearly in FIG. 1, the heat exchange wall 6 and the thermal insulation wall 8 have practically the same surface area as the radiating downstream surface 3b of the catalytic combustion wall 3 that is to say the working surface thereof.

The heat exchange wall 6 has, as appropriate, a thickness greater than that of the walls 3 and 8, according to the amount of heating that it is desired to give the mixture for burning prior to its catalytic combustion or oxidation.

A window pane 23 made of transparent ceramic material closes, in a sealed manner, an opening 22 in the box 21, facing the downstream face 3b of the catalytic combustion wall 3. This box 21 with its opening 22 closed by the window pane 23 forms, with the seat of combustion 2, a circuit 24 for discharging the flue gases leaving via the downstream face 3b of the catalytic combustion wall 3.

The box 21 has an interior liner 27, made of insulating and refractory material and which, with the sleeve 16 of the seat of combustion 2, forms an annular gap in which the flue gases 25 flow countercurrent-wise with respect to the mixture 4 for burning.

The circuit 24 for discharging the burnt gases is arranged to discharge these gases transversely with respect to the direction of travel of the mixture 4 for burning, through a passage in the refractory liner 27, communicating on one side, with the annular gap 24 between sleeve 16 and liner 27 and, on another side, with the outside.

Figure 2:
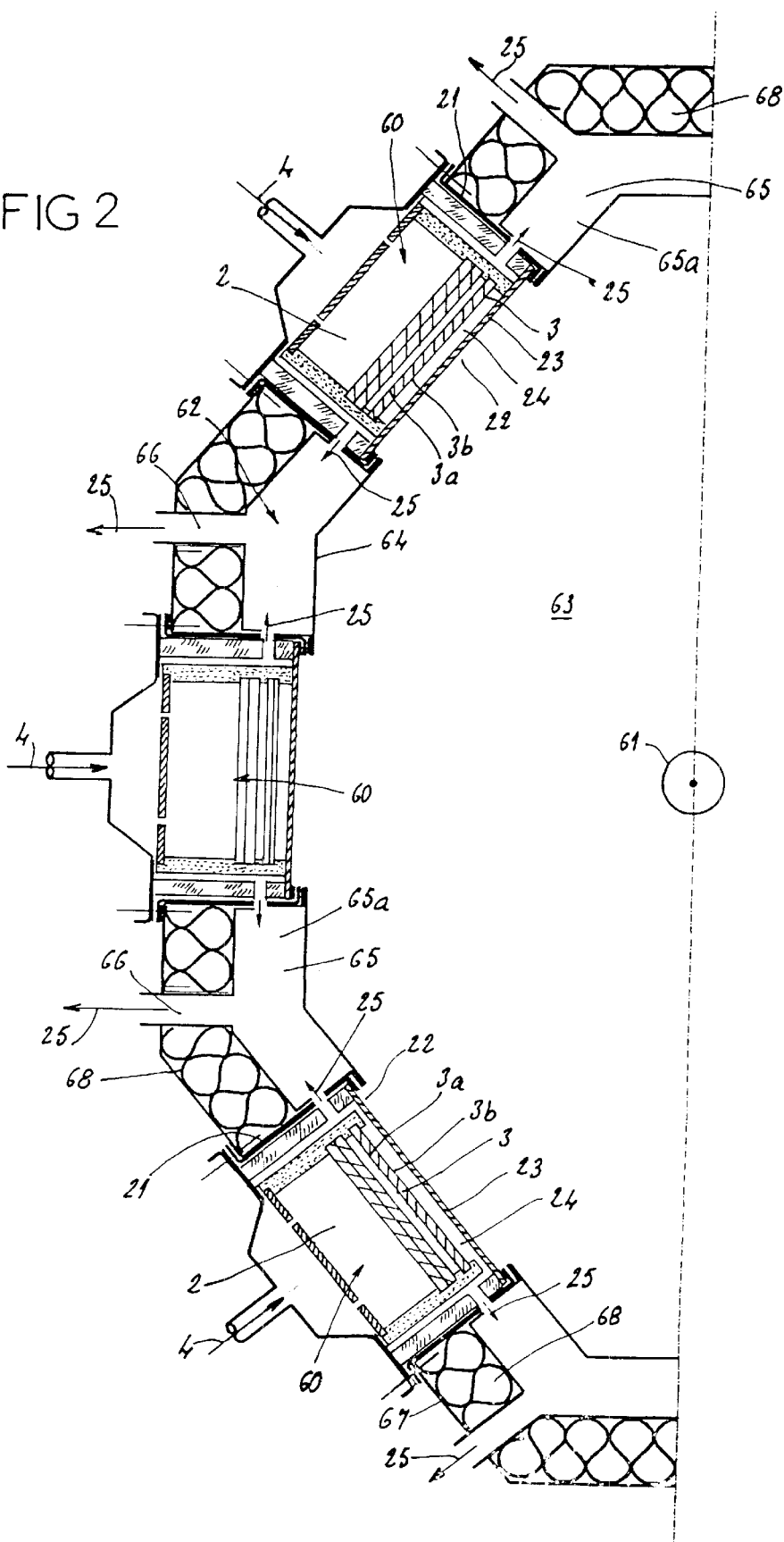
FIG. 2 depicts, diagrammatically and in cross section, an installation for the surface emission of infrared radiation, of the tunnel type, and incorporating or comprising a number of unitary equipments, each with a surface emission device according to FIG. 1.

In accordance with FIG. 2, the installation 63 for the surface emission of infrared radiation comprises a thermally insulated wall 62 forming a tunnel with is elongate in a direction of residence or circulation 61 of at least one object to be treated with the infrared radiation.

A number of unitary equipments 1, the surface emission device of which has been described essentially with reference to FIG. 1, are each arranged with respect to and in the thermally insulated wall 62 in such a way that the downstream faces 3b of the various devices 1 respectively emit elementary infrared radiation directed toward the inside of the tunnel.

The thermally insulated wall 62 comprises a secondary surface emission metal sheet 64, in a direct heat-exchange relationship (particularly by radiation) with the inside of the tunnel. This metal sheet 64 forms, with the rest of the wall 62, a channel 65 for the flat circulation of the flue gases 25, communicating on one side with the circuits 24 for discharging the flue gases 25 of at least some, if not all, of the unitary equipments 60 and, on the other side, with at least one, if not a number (the same number as there are unitary equipments 60) of outlet pipes 66 for transferring the flue gases 25 out of the thermally insulated wall 62.

The thermally insulated wall 62 comprises two metal sheets 64 and 67, one of which is the aforementioned secondary surface emission sheet 64. These sheets are spaced apart by the boxes 21 of the emission devices 1 of the unitary equipments 60 respectively, and a thermally insulating lining 68 is placed between the two sheets 64 and 67 and, with the surface emission sheet 64, forms the channel 65 for the flat circulation of the flue gases 25.

As shown clearly in FIG. 2, two consecutive unitary equipments 60 are separated by a segment 65a of the channel 65 for the flat circulation of the burnt gases 25. A segment such as this communicates on each side with the circuits 24 for discharging the same flue gases 25 of the two consecutive unitary equipments 60 respectively, and also at another end communicates with a common outlet pipe 66 for the flue gases 25.

As shown clearly in FIG. 1, the circuit 24 for discharging the burnt gases of the surface emission device 1 of each unitary equipment 60 is arranged in such a way as to discharge these gases transversely with respect to the direction in which the mixture 4 for burning flows, on each side of the box 21, into the flue gas flat circulation channel 65.

As shown clearly by the combination of FIGS. 1 and 2, the number of window panes 23 close the openings 22 formed in the boxes 21 of the devices 1 of the unitary equipments 60 respectively, to form in each, and in part, the various circuits 24 for discharging the flue gases 25, communicating with the flat circulation channel 65 therefor.

Figure 3:
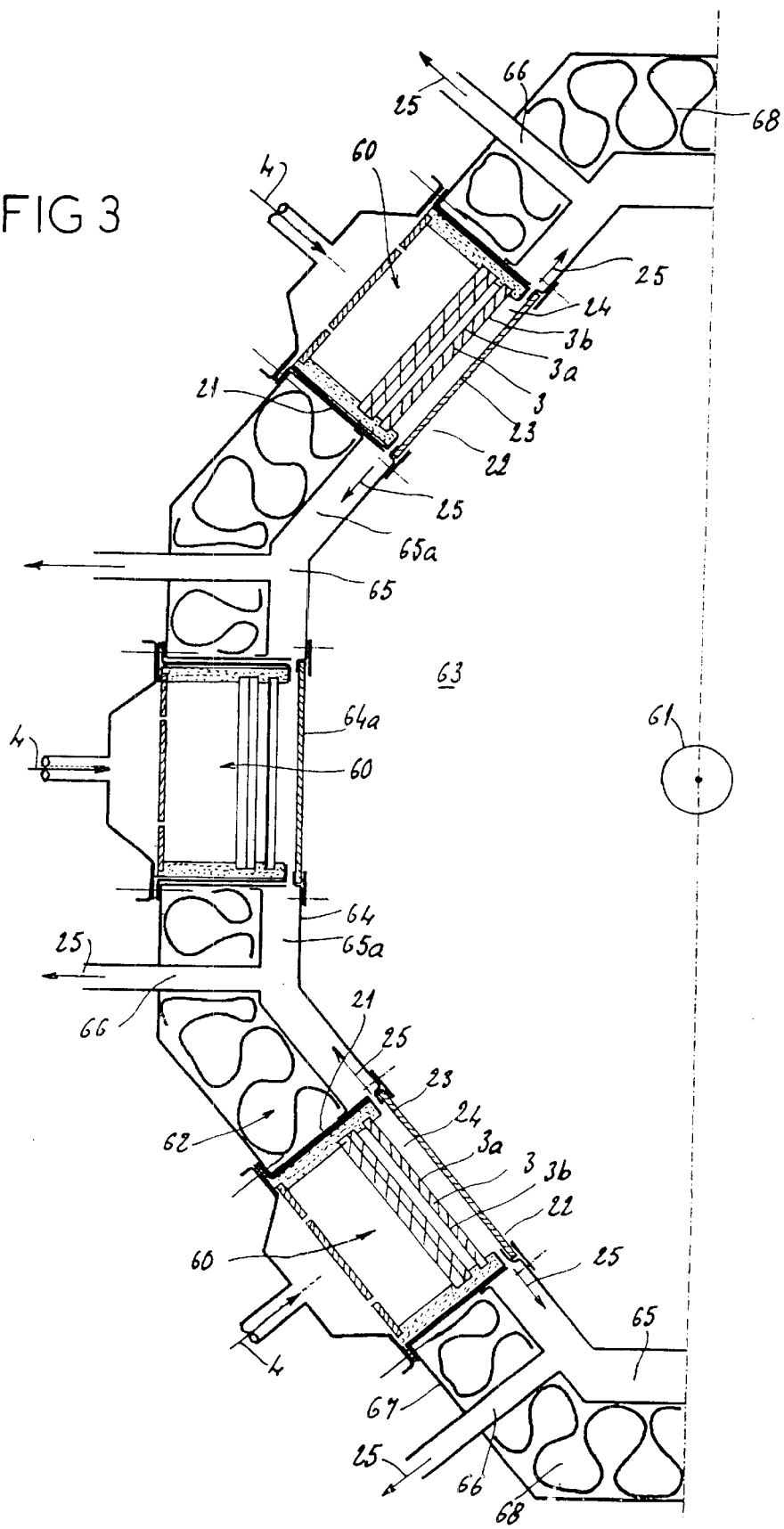
FIG. 3 depicts, still diagrammatically and in cross section, another surface emission installation of the tunnel type incorporating or comprising a number of unitary equipments, each with a surface emission device.

The installation depicted in FIG. 3 differs from the one described with reference to FIGS. 2 and 1 in that the number of window panes 23 is arranged in the thermally insulated wall 62. For this purpose, the number of window panes 23 close apertures formed in the surface emission sheet 64, respectively facing the downstream faces 3b of the devices 1 of the unitary equipments 60, thus ensuring continuity of the flow of flue gases between the flat circulation channel 65 and the discharge circuits 24 of the devices 1 of the various unitary equipments 60 respectively.

Figure 4:
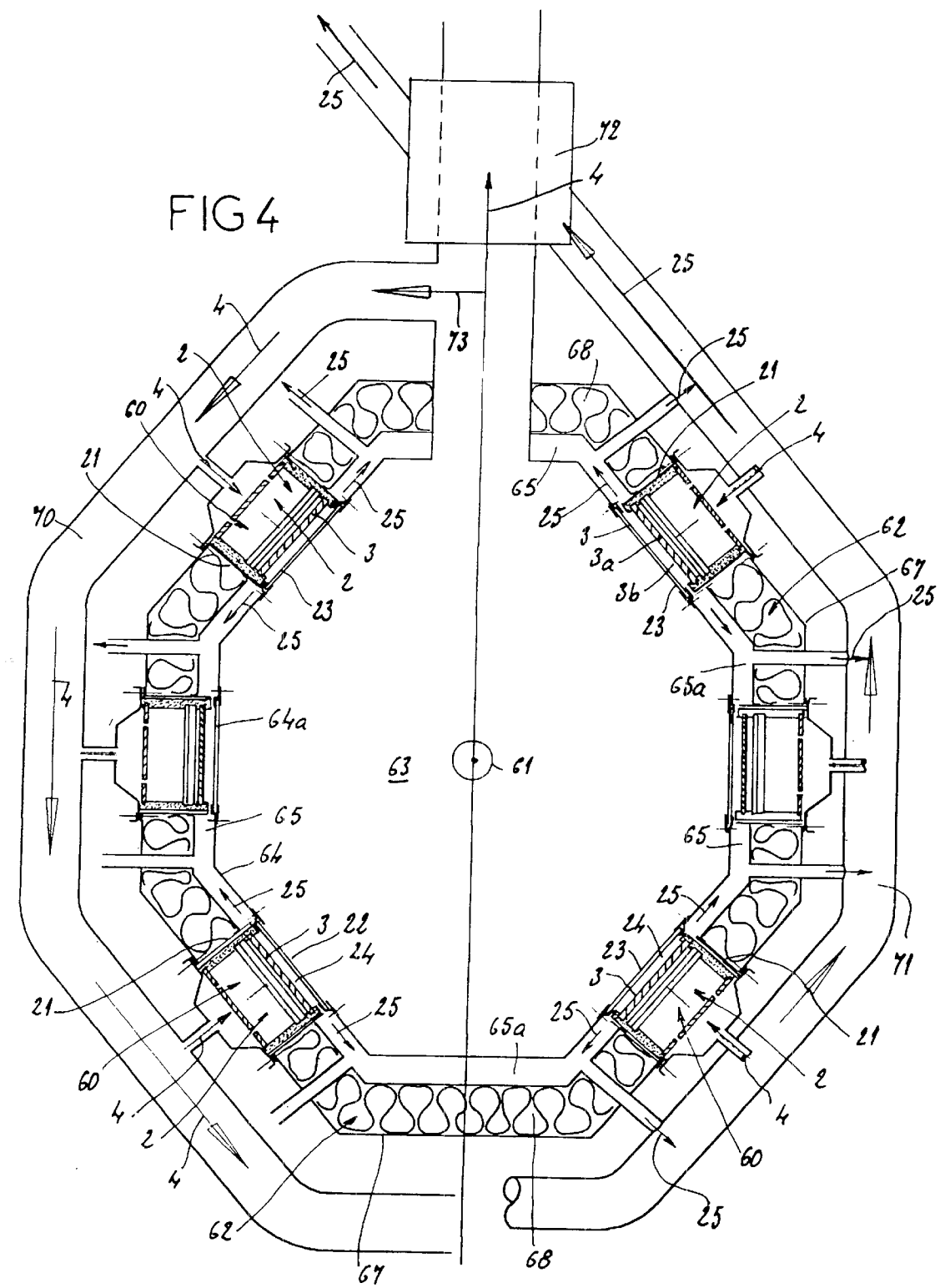
FIG. 4 depicts, still in section and diagrammatically, another surface emission installation of the tunnel type comprising or incorporating a number of unitary equipments, each with a surface emission device according to FIG. 1.

The installation 63 or the equipment according to FIG. 4 differs from that described with reference to FIG. 3 in that it comprises a distributor 70 for distributing the mixture 4 for burning to the various unitary surface emission equipments 60 respectively, and a manifold 71 for collecting the flue gases 25 from the various pipes 66 used for discharging said gases. A heat exchanger 72 for the exchange of heat between the flue gases 25 collected and the distributed mixture 4 for burning is also arranged at the exit of the tunnel. Furthermore, at least some 73 of the discharged residual air stream, which may contain volatile organic compounds (VOCs), is mixed with the distributed mixture 4 for burning. This last arrangement in particular makes it possible, on the one hand, to use the residual heat in the burnt gases to keep the various catalytic combustion walls 3 of the devices 1 of the various unitary equipments 60 hot and, on the other hand, allows the VOCs to be burnt in these unitary equipments 60, making it possible, in passing, to remove pollution from the residual gases.

Any installation 63 of the tunnel type may comprise or incorporate, in place of the unitary equipments previously described, unitary equipments as described hereinbelow with reference to FIGS. 5 and 6.

The surface emission device 1 depicted in FIG. 5 differs from the one previously described with reference to FIG. 1 through the following characteristics:

the thermally insulating wall 8 and the diffuser 11 constitute one and the same component 90, for example a wall made of ceramic foam, which is up against the heat exchange wall 6 which is relatively thick, that is to say relatively long in the direction in which the mixture 4 for burning flows;

the interior liner 27 is omitted, which means that the inner sleeve 16 is in direct contact with the box 21, and the gap between the sleeve 16 and the liner 27 is eliminated;

the window pane 23 is omitted, which means that the opening 22 remains open for the passage of the flue gases 25.

A unitary surface emission equipment 60 according to FIG. 6, comprises a casing 80 delimited in part by a metal wall 81, which comprises an opening 24 closed by a window pane 23, and an adjacent secondary surface emission part 81a, partially forming a channel 65 for the flat circulation of the flue gases 25. Moreover, the casing 80 is delimited by a transverse metal wall 87, the open part of which is closed by a metal plate 86 crimped onto the lateral wall 87. The surface emission device 1 described previously with reference to FIG. 5 is arranged within the casing 80, in such a way that the downstream face 3b of the catalytic combustion wall 3 faces the window pane 23, forming therewith a circuit 24 for discharging the flue gases 25. This circuit 24 communicates with the flue gases flat circulation channel 65, which is elsewhere delimited by an internal partition 89 located within the casing 80. An outlet 66 for the flue gases is arranged on the casing 80 and communicates with one end of the flat circulation channel 65, which is the opposite end to the circuit 24 for discharging the flue gases 25 from the device 1. What is more, the hollow parts of the casing 80 are filled with thermally insulating filling 88.

What is claimed is:

1. Equipment (60) for the surface emission of infrared radiation for treating an object with said infrared radiation, comprising at least one surface emission device (1) arranged in such a way that its face (3b) emitting the infrared radiation faces toward said object, said surface emission device (1) comprising a seat of catalytic combustion (2) comprising a catalytic combustion wall (3) made of material permeable along its thickness and designed for the passage of a mixture (4) for burning, from its upstream face (3a) to its downstream face (3b) emitting said infrared radiation and discharging the flue gases (25), characterized in that, in combination:

the surface emission device (1) comprises a box (21) in which the seat of catalytic combustion (2) is arranged at least in part, and in which there is formed an opening (22) facing the downstream face (3b) of the catalytic combustion wall (3);

at least one window pane (23) made of transparent ceramic material is mounted so as to form, with the seat of catalytic combustion (2), a circuit (24) for discharging the flue gases (25) leaving via the downstream face (3b) of said surface emission device (1);

said equipment comprises a secondary surface emission metal sheet (64) forming a flat circulation channel (65) for the flue gases (25) and communicating on the one side with the circuit (24) for discharging the flue gases (25) of the surface emission device (1) and, on the other wised with at least one outlet pipe (66) for transferring the flue gases (25) out of the equipment.

2. Equipment according to claim 1, characterized in that the flue gases discharge circuit (24) of the surface emission device (1) is arranged to discharge these gases transversely with respect to the direction in which the mixture for burning (4) passes, outside the box (21), in the burnt gases flat circulation channel (65).

3. Equipment according to claim 2, characterized in that the window pane (23) closes the opening (22) in the box (21) of the surface emission device (1), partially forming the flue gases discharge circuit (24).

4. Equipment according to claim 2, characterized in that the window pane (23) closes an aperture (64a) formed in the secondary surface emission sheet (64), facing the downstream face (3b) of the surface emission device (1), ensuring continuity of the flow of flue gases (25) between the flat circulation channel (64) and the discharge circuit (24) of the surface emission device (1).

5. Installation (63) comprising a thermally insulated wall (62) forming a tunnel which is elongate in a residence direction (61) of at least one object that is to be treated with the infrared radiation, and a number of unitary surface emission equipments (60) according to claim 1, each arranged with respect to and in the thermally insulated wall (62) in such a way that their face (3b) emitting the infrared radiation faces toward the inside of the tunnel (63), characterized in that, in combination:

each unitary item of equipment (60) is arranged in the thermally insulated wall (62);

a number of window panes (23) are mounted, either in the boxes (21) of the unitary items of equipment (60) respectively, or in the thermally insulated wall (62), so as to form a number of burnt gas discharge circuits (24);

the thermally insulated wall (62) comprises a sheet (64) in a direct heat-exchange relationship with the inside of the tunnel, forming with the rest of the wall (62), a channel (65) for the flat circulation of the flue gases from at least some of the surface emission devices (1) of the unitary items of equipment (60) and, on the other side, with the outside of the thermally insulated wall (62).

6. Installation according to claim 5, characterized in that the thermally insulated wall (62) comprises two metal sheets, including the secondary surface emission sheet (64), which are spaced apart by the boxes (21) of the surface emission devices (1) of the respective unitary items of equipment (60), and an insulating lining (68) arranged between the two sheets and forming, with the surface emission sheet, the channel (65) for the flat circulation of the flue gases (25).

7. Installation according to claim 5, characterized in that two consecutive unitary surface emission equipments (60) are separated by a segment (65a) of the channel (65) for the flat circulation of the burnt gases (25) communicating, at each end, with the circuits (24) for discharging these same flue gases (25) of the two consecutive unitary equipments (60) respectively and also communicating with a common outlet pipe (66) for letting out the flue gases (25).

8. Installation according to claim 7, characterized in that at least part (73) of the residual air stream discharged is mixed with the distributed mixture (4) for burning.

9. Installation according to claim 5, characterized in that it comprises a distributor (70) for distributing the mixture (4) for burning to the unitary surface emission equipments (1) respectively, and a manifold (71) for collecting the flue gases (25) from the various flue gas discharge pipes.

10. Installation according to claim 8, characterized in that it comprises a heat exchanger (72) for exchanging heat between the collected flue gases (25) and the distributed mixture (4) for burning.

11. Unitary equipment according to claim 1, characterized in that it comprises a casing (80) delimited in part by a metal wall (81) which has an opening (24) closed by a window pane (23) and an adjacent secondary surface emission part (81a), partially forming a channel (65) for the flat circulation of flue gases (25), the surface emission device (1) being arranged within the said casing in such a way that the downstream face (3b) of the catalytic combustion wall (3) faces the window pane, forming therewith a circuit (24) for discharging the flue gases (25) communicating with said flat circulation channel (65), and an outlet (66) for the flue gases being arranged on said casing and communicating with one end of said flat circulation channel (65) which is the opposite end to the circuit (24) for discharging the flue gases (25).

12. Equipment according to claim 1, wherein the mixture (4) for burning comprises a fuel gas (30) plus oxidizing gas (31).

13. Equipment according to claim 12, wherein the oxidizing gas (31) comprises air.

14. Equipment according to claim 1, wherein said at least one window pane (23) is mounted in the box (21) of the surface emission device (1).

* * * * *